United States Patent
Chow et al.

(10) Patent No.: US 9,894,537 B2
(45) Date of Patent: Feb. 13, 2018

(54) AUTONOMOUS PROXIMITY-BASED STANDBY MODE SWITCHING REMOTE ANTENNA UNIT

(75) Inventors: Bruce Cinkai Chow, Brooklyn, NY (US); Ming Li Yee, Singapore (SG)

(73) Assignee: Corning Incorporated, Corning, NY (US)

(*) Notice: Subject to any disclaimer, the term of this patent is extended or adjusted under 35 U.S.C. 154(b) by 517 days.

(21) Appl. No.: 13/988,942

(22) PCT Filed: Nov. 28, 2011

(86) PCT No.: PCT/US2011/062183
§ 371 (c)(1),
(2), (4) Date: Nov. 1, 2013

(87) PCT Pub. No.: WO2012/074896
PCT Pub. Date: Jun. 7, 2012

(65) Prior Publication Data
US 2014/0051348 A1  Feb. 20, 2014

Related U.S. Application Data

(60) Provisional application No. 61/418,370, filed on Nov. 30, 2010.

(51) Int. Cl.
*H04B 7/14* (2006.01)
*H04W 16/26* (2009.01)
(Continued)

(52) U.S. Cl.
CPC ...... *H04W 16/26* (2013.01); *H04B 10/25756* (2013.01); *H04W 52/0225* (2013.01); *Y02B 60/50* (2013.01)

(58) Field of Classification Search
CPC .... H04W 88/085; H04W 16/32; G01S 5/0257
(Continued)

(56) References Cited

U.S. PATENT DOCUMENTS

| 4,863,123 A | 9/1989 | Bernard et al. ............... 246/122 |
| 5,339,184 A * | 8/1994 | Tang ............................. 398/116 |

(Continued)

FOREIGN PATENT DOCUMENTS

| EP | 1467504 | 10/2004 |
| JP | 10285095 A | 10/1998 |

(Continued)

OTHER PUBLICATIONS

International Searching Authority; International Search Report; Mailing Date: Mar. 6, 2012; pp. 1-4.

(Continued)

*Primary Examiner* — Md Talukder
(74) *Attorney, Agent, or Firm* — Gregory V. Bean

(57) ABSTRACT

A broadband wireless mobile communication system for high a speed mobile transportation corridor and methods for operating such a system are disclosed, including a base station and remote antenna units distributed along the corridor and sectors of the respective base station communicating with the base station via radio over fiber. An autonomous sensing remote antenna unit structured is used as one or more of the remote antenna units, which toggles between standby and active modes in response to locally sensed presence of one or both of a mobile transceiver and a vehicle along the corridor.

9 Claims, 6 Drawing Sheets

(51) Int. Cl.
*H04B 10/2575* (2013.01)
*H04W 52/02* (2009.01)

(58) Field of Classification Search
USPC .................................. 455/7, 73, 522, 41.3
See application file for complete search history.

(56) References Cited

U.S. PATENT DOCUMENTS

| | | | |
|---|---|---|---|
| 5,465,926 A | 11/1995 | Brown | 246/34 |
| 6,198,921 B1 | 3/2001 | Youssefzadeh et al. | |
| 6,592,245 B1* | 7/2003 | Tribelsky | B64F 1/007 |
| | | | 362/259 |
| 7,313,415 B2 | 12/2007 | Wake et al. | |
| 7,493,119 B2 | 2/2009 | Bergstrom et al. | |
| 7,548,695 B2 | 6/2009 | Wake | |
| 8,471,780 B2* | 6/2013 | Dalmazzo | G01B 21/22 |
| | | | 343/760 |
| 2002/0121991 A1 | 9/2002 | Rostren | 340/988 |
| 2003/0129984 A1* | 7/2003 | Dent | H04B 1/715 |
| | | | 455/446 |
| 2006/0276201 A1* | 12/2006 | Dupray | 455/456.1 |
| 2008/0070502 A1 | 3/2008 | George et al. | |
| 2009/0082025 A1* | 3/2009 | Song | 455/446 |
| 2009/0097855 A1 | 4/2009 | Thelen et al. | |
| 2009/0135778 A1 | 5/2009 | Lee et al. | |
| 2010/0080555 A1* | 4/2010 | Xu | H04B 10/25755 |
| | | | 398/43 |
| 2010/0159838 A1 | 4/2010 | Xu et al. | |
| 2010/0297990 A1* | 11/2010 | Le Pezennec | H04W 88/08 |
| | | | 455/422.1 |
| 2012/0033611 A1* | 2/2012 | Wu | H04W 24/02 |
| | | | 370/328 |
| 2012/0281565 A1* | 11/2012 | Sauer | H04W 64/00 |
| | | | 370/252 |
| 2013/0157664 A1* | 6/2013 | Chow | H04W 88/085 |
| | | | 455/436 |

FOREIGN PATENT DOCUMENTS

| | | |
|---|---|---|
| JP | 2007200021 A | 8/2007 |
| WO | 2006044885 A3 | 4/2006 |
| WO | 2010075865 A1 | 7/2010 |
| WO | 2012/074896 | 6/2012 |

OTHER PUBLICATIONS

Chow et al.; "Radio-over-Fiber Distributed Antenna System for WiMAX Bullet Train Field Trial"; IEEE Computer Society 2009; pp. 98-101.

Lannoo et al.; "Optical Switching Architecture to Realize "Moveable Cells" in a Radio-over-Fiber Network"; ICTON 2004; pp. 2-7.

Al-Raweshidy, "Radio over fiber technology for the next generations" Radio over Fiber Technologies for Mobile Communications Networks—Ch. 4, pp. 183-216, accessed Jul. 17, 2010.

* cited by examiner

AUTONOMOUS PROXIMITY-BASED STANDBY MODE SWITCHING REMOTE ANTENNA UNIT

This application claims the benefit of priority under 35 USC § 119 to U.S. Provisional Application Ser. No. 61/418,370 filed Nov. 30, 2010 the content of which is relied upon and incorporated herein by reference in its entirety.

BACKGROUND

Broadband wireless access (BWA) is an area of much growth in recent times. As users become increasingly mobile, one of the new areas of providing this BWA is on mobile platforms such as on railways, highways and similar routes of passage. Mobile Distributed Antenna Systems-(MDAS) can be deployed to provide such continuous wireless coverage for BWA over these passages. MDAS Remote Antenna Units (RAUs) are placed at sites with poor signal strength to improve coverage. These RAUs are connected back to the central head-end office via fiber where the base station resides. These RAUs essentially replicate the signal generated by the base station in the downlink direction as well as replicate the signal generated by the mobile station in the uplink direction. These replicated signals are transmitted over fiber in the appropriate uplink and downlink direction. Thereby, the MDAS concept is a fiber based one-to-many (and many-to-one) repeater system.

However, this MDAS concept can introduce severe multipath effects that will compromise data integrity. This happens when the receiver receives multiple copies of the same signal at different times transmitted by different RAUs; such delays arise from different fiber and wireless distances. The resulting echo of previous data will create interference at the receiver for the current datagram and the echo of the current data will interfere with a subsequent datagram. Loss of data and/or loss of acknowledgement signals can result such that overall data rate is reduced.

MDAS systems have high wireless transmission power requirements as coverage areas are typically large. High power consumption is associated with such high power wireless transmission systems. For extensively deployed DAS for mobile BWAs, many RAUs are needed to ensure sufficiently high signal-to-noise ratio to support the high data rates prescribed in 4th generation BWA. Thus, power consumption is substantial for many RAUs. Therefore, there is a need to reduce overall DAS system power consumption into order to reduce operating costs.

As the number of RAUs within a DAS system increases, the increasing number of active uplink RAU circuits contribute to noise at the receiver at the head-end. This increases the noise floor for the system and thus reduces overall performance and receiver sensitivity suffers. Thus overall noise floor of the system increases with increasing number of active RAUs. In a larger DAS system, this increase in overall noise floor can reduce the sensitivity of the receiver and reduce the coverage of the RAU.

SUMMARY

In consideration of the problems encountered in a conventional RAU design as mentioned above, this document discloses a devices and methods that provide for a RoF RAU that delivers higher performance over tradition RAUs. Traditional RAUs are always in active mode and are always transmitting the downlink signal originating from the base station, regardless if a mobile transceiver is in the vicinity or not. Similarly, the RAUs are always transmitting noise back to the base station even if there are no mobile transceivers nearby. The RAUs according to the present disclosure are self-aware of the presence of mobile transceivers within the proximity of the RAU and use this awareness to place themselves into active or standby mode. When the RAU senses a mobile transceiver on a vehicle along the route of passage in the vicinity, it will toggle itself to the active mode. This in turn activates the downlink power amplifiers and uplink lasers and thus completing the communications path to and from the head-end base station. The RAU remains active over the duration over which the vehicle remains in the service area. When the mobile transceiver leaves the vicinity, the RAU senses this event and places the downlink power amps and uplink laser back into standby mode and awaits the next mobile transceiver to enter the coverage area. This disclosure further includes a mobile transceiver sensing system to sense the presence of the vehicle with a mobile transceiver. This system senses the presence of the mobile transceiver and uses this sensor output levels to determine when to place the RAU into active mode and/or into standby mode. The method of proximity sensing can include but is not limited to radio frequency signal strength, RFID, Radar, LiDAR, vibrations, acoustics, optical detection, machine vision, Doppler detection, wireless beacon, and RSSI. Additionally, the sensing implementation may also be a combination of several proximity sensing methods.

In traditional radio over fiber (RoF) RAUs, no provision is made to sense the presence of approaching or leaving mobile transceivers. As a result, these RAUs are not be able to toggle between active and standby mode triggered by proximity of a mobile station. This disclosure presents a new system and method that is able to place the RAU into standby mode.

Traditional RAUs are always in active mode regardless of whether they are transmitting the signal productively. This can create several problems. One of which is multipath fading. Multiple echoes can constructively interfere and build up or destructively interfere and fade the intended signal at the point of reception due to the multiple paths that the signal can travel through the fiber and air interface to reach the destination. Additionally, the multiple echoes delayed in time due to different fiber lengths and air distances cause various copies of the same data packet to arrive at various times and interfere with subsequent data packets. This Inter-symbol Interference (ISI) can cause the current packet and the subsequent packet to be undecipherable and as a result, the packet is lost and a retransmission will be requested. This therefore results in loss in overall throughput. According to the present disclosure, the RAU is placed in default standby mode. Using proximity sensors, it senses the presence of an approaching vehicle and switches itself into the active mode. Upon the vehicle exiting the coverage area of the RAU, the RAU senses this and turns itself back onto standby mode. The advantage of this implementation allows the other RAUs not in the immediate and adjacent vicinity of the vehicle to cease transmission, thus reducing instances of multipath interference. This benefits both uplink and downlink data packets.

A second advantage of this is significant power savings. For a 13-RAU implementation, traditional RAUs would typically consume 13 times the power consumption of 1 RAU. In this example, the disclosed devices and methods would put only the individual RAU closest to the vehicle, as well as the two adjacent RAUs, into active mode; thus reducing overall power consumption by as much as 76.9% over traditional RAUs. This power savings scales upward with larger numbers of RAUs deployed. For a 24-RAU deployment, the typical power reduction will be 87.5%.

A third advantage is that uplink signals fed back to the base station will have improved signal to noise ratio over traditional methods. In traditional RAUs, the base station is fed by all the active RAUs in the field. If the lasers in such RAUs are active but not transmitting data, the signal combined from numerous RAUs collectively received by the head end unit (HEU) has an increased noise floor and the sensitivity of the receiver is reduced. The devices and methods of the present disclosure improve upon this problem by switching the RAUs that are not transmitting data to a standby mode. This ensures only the single RAU in the vicinity of the vehicle and the two adjacent RAUs will be active, and thus the noise contributions come from 3 RAUs or less, instead of from all the RAUs as in the traditional case.

In short, the devices, systems, and methods of the present disclosure possesses the ability to autonomously sense and activate RAUs when there is an approaching mobile transmitter. This ability brings about reduction in cumulative noise presented to the base station in the UL direction, overall power savings, and reduction in inter-symbol interference, thus resulting in overall improvement of data rates and in decreased operating expense.

DETAILED DESCRIPTION

Figure 1:
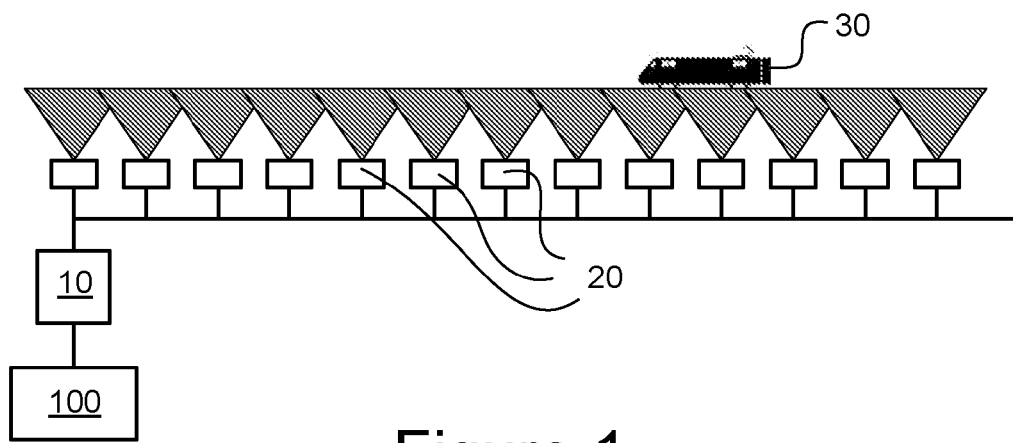
FIG. 1 is a diagrammatic representation of traditional DAS RAU in operation.

The RAU disclosed herein serves to re-transmit WiMAX signals in the downlink and uplink path with the means to switch itself into standby mode. In a radio over fiber (RoF) distributed antenna system (DAS), all the RAUs 20 are connected to a head-end unit 10 associated with a base station 100 as illustrated in FIG. 1. In the downlink direction, the HEU 10 transmits an optical representation of the radio signal to the RAUs 20. This is reversed in the uplink direction. Traditional RAUs 20 are in active mode at all times, as represented by the shaded triangles, symbolically representing the coverage areas of the respective RAUs 20. When a vehicle 30 travels along the transit route, the vehicle's mobile radio transceiver receives the signals transmitted by all the RAUs 20. This causes copies of the same signal originating from different RAUs 20 to arrive at the receiver at different times, since the fiber length and air interface are of different lengths. This can pose a problem of multipath interference that exceeds the multipath tolerance of a given wireless standard's protocol. In a DAS with long fiber lengths, each data packet copy can travel over paths of varying distances to arrive at the receiver at different times. The difference between the shortest and longest paths travelled can be great enough that a packet meant for the a given data time slot can reach the receiver at time slots not meant for it. Therefore the last data packet of one time slot might reach the receiver at the same time as the first data packet of the next transmission time slot. In the worst case, the entire data link could cease to transfer any useful data altogether as late arriving packets repeatedly arrive at the wrong time slots. Similar problems can occur or uplink data transmission when the base station receives echoes of a data packet in time slots in which it is not expected to arrive.

Figure 2:
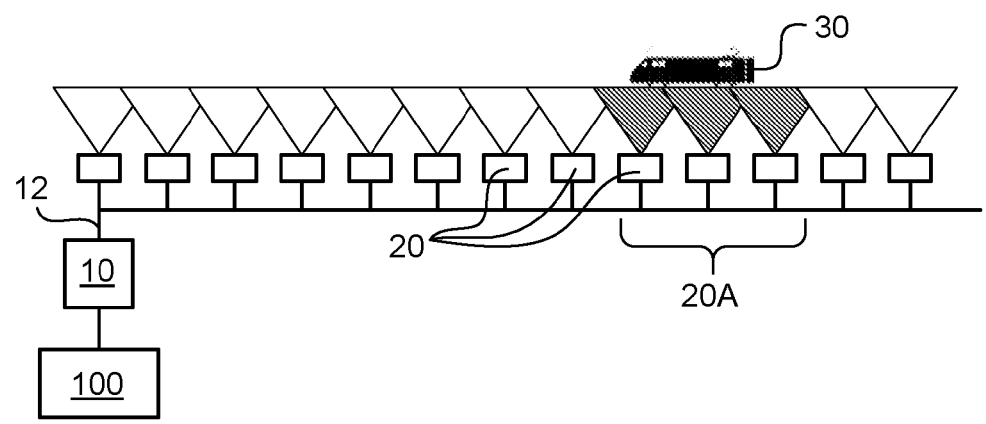
FIG. 2 is a diagrammatic representation of an embodiment of a system and method of the present disclosure.
Figure 3A:
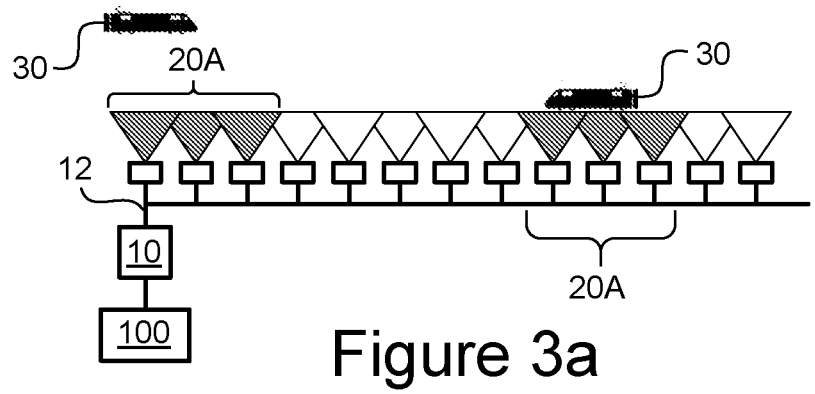
FIG. 3a-3c are diagrammatic representations of an embodiment of a system and method of the present disclosure operating with two vehicles.
Figure 3B:
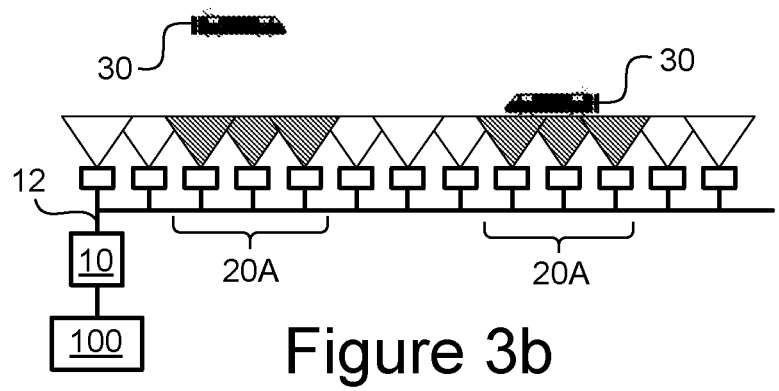
Figure 3C:
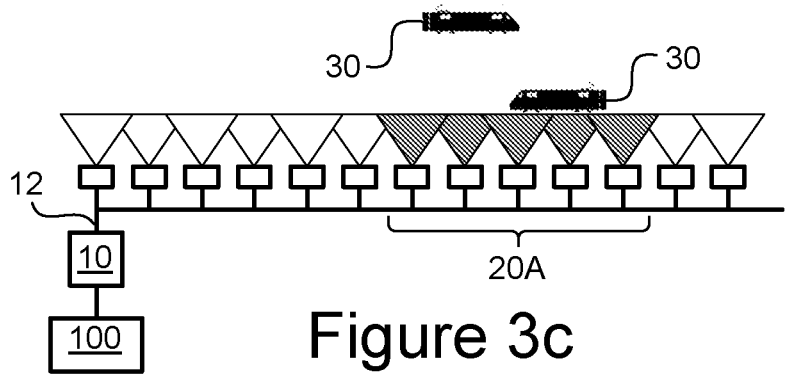

FIG. 2 shows a DAS system using an RAU embodiment described in this disclosure. In the normal state, each RAU 20 is in a default standby mode (represented by lightly shaded triangles symbolizing to transmission in those coverage areas). Each RAU 20 independently senses for the presence of a mobile transmitting and receiving device approaching its vicinity on a vehicle 30. RAUs 20 that are in the vicinity of the vehicle 30 will be in active mode. No control signal from HEU 10 is required for the switching activity of the RAUs 20 as each RAU 20 will autonomously monitor and activate itself. When there are no in-band mobile radio devices around, the individual RAU 20 remains in standby mode and some portion of the down-link (DL) and up-link (UL) circuits are inactivated. Each RAU 20 monitors its respective service area independently, using one of more proximity sensors. These proximity sensors may, for example, produce an output signal whose strength is proportional to a decreasing distance of an approaching vehicle 30. Accordingly, when this proximity signal exceeds a pre-determined threshold, the RAU 20 is put into active mode. This threshold level corresponds to the proximity sensor signal level when the vehicle 30 is within (or is about to come within) the coverage area of the RAU 20. When the vehicle 30 exits the coverage area, the proximity signal falls below this pre-determined threshold and the RAU 20 returns to standby mode. Thus the proximity signal serves as a trigger signal to place the RAU 20 into standby or into active mode. When a vehicle 30 with a mobile transmitting device travels along the transit route, each of the RAUs 20 will switch itself into active mode whenever the vehicle 30 is within the coverage area of the respective RAU 20. Once in active mode, previously inactive DL and UL circuits will be pulled out of standby and resume normal operation; transmitting and receiving signals from the mobile transmitting device via radio over fiber link (RoF link) 12. Once the vehicle leaves the respective area of the RAU, the RAU senses this event via the pre-determined threshold level via proximity sensor and returns to the standby mode. The threshold levels of the RAUs are configured such that no more than 3 RAUs will be put into active mode at any one time per vehicle. In another scenario where there are 2 vehicles, FIG. 3a-3c shows the RAUs activated when there are 2 vehicles travelling along the route of passage.

Figure 4:
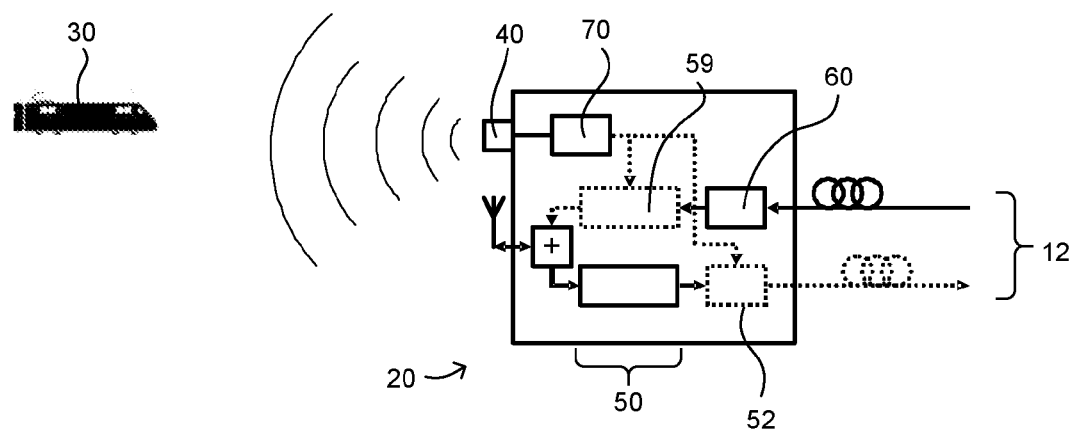
FIG. 4 is a block diagram of an RAU according to an embodiment of the present disclosure in an out-of-range condition.
Figure 5:
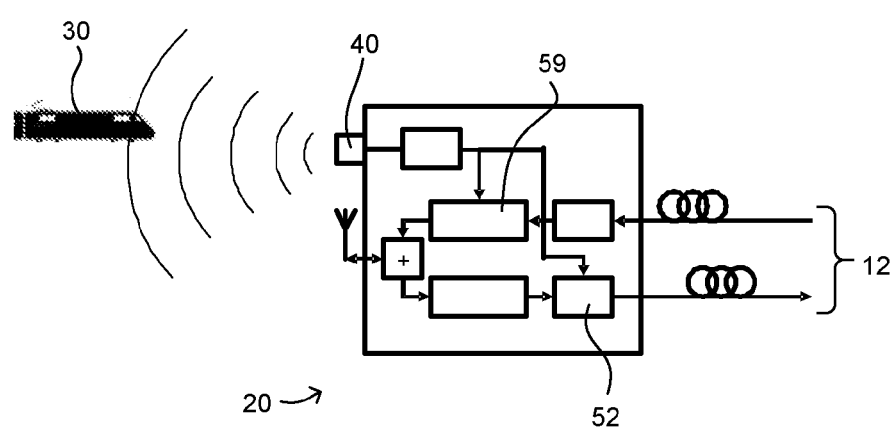
FIG. 5 is a block diagram of an RAU according to an embodiment of the present disclosure in an in-range condition.

FIG. 4 shows a general block diagram of an embodiment of an RAU 20 equipped with one proximity sensor 40, a bidirectional amplifier stage 50, lasers 52, photo detectors 60, a microcontroller (MCU) 70 in the standby mode. In this mode, the proximity sensor 40 is not yet able to sense the presence of the vehicle 30, or at least a signal produced within or by the proximity sensor 40 (and provided to the MCU 70) has not yet reached a threshold set for detection of the vehicle 30. Therefore in this mode, the proximity sensor 40 relays a signal to the MCU 70 representative of no vehicle in the area of service of the RAU 20. The MCU reads this signal and interprets this as no vehicle in its service area and remains in standby mode. When a vehicle 30 enters the service area of the RAU 20 as shown in FIG. 5, the proximity sensor 40 relays a signal to the MCU 70, and, in this embodiment, the MCU 70 compares the received signal strength with the threshold level representative of the vehicle 30 being "within the service area" of the RAU 20. Since the vehicle 30 is within the coverage or service area in the position shown in FIG. 5, the MCU 70 pulls both the DL amplifiers 59 and UL laser 52 out of standby mode and into active mode. This action therefore completes the DL and UL paths for data packets to be transmitted to the mobile transmitter and back to the HEU 10 via the fiber link 12 connected to the newly activated RAU 20.

Figure 6:
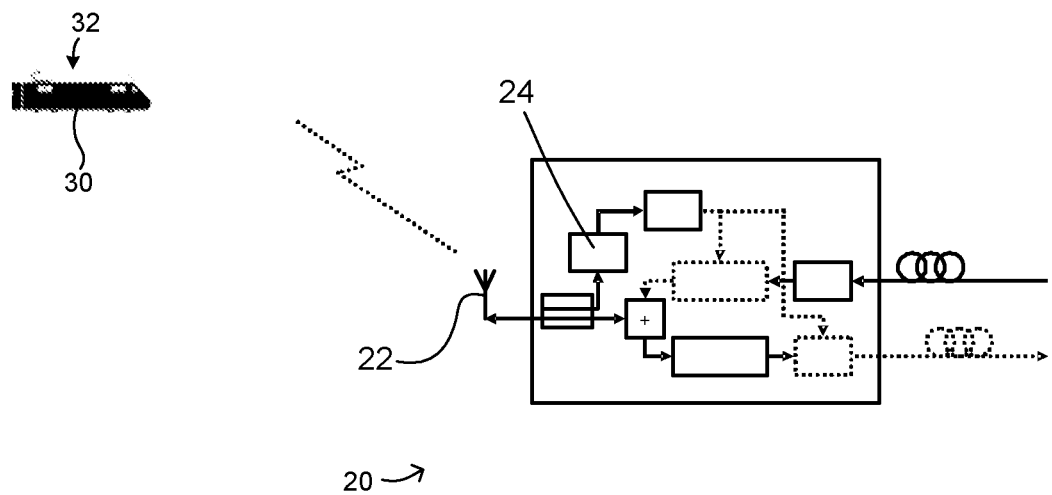
FIG. 6 is a block diagram of an RAU according to an embodiment of the present disclosure utilizing an RSSI (received signal strength indication) proximity detector.
Figure 7:
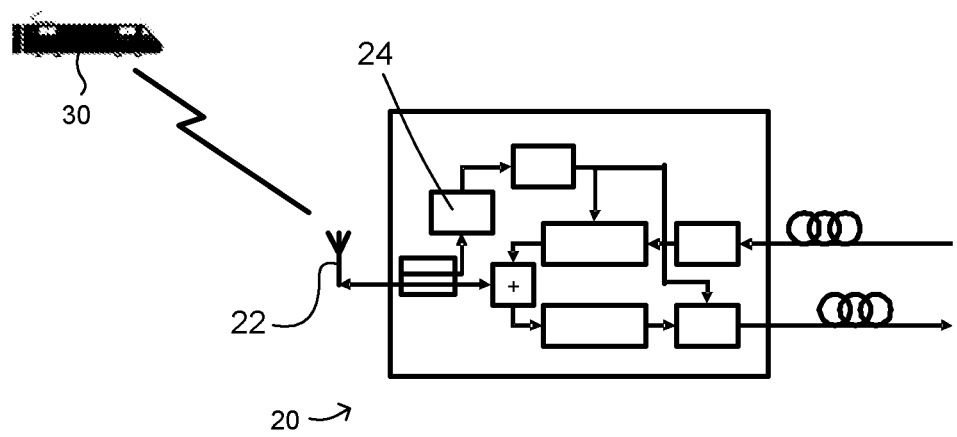
FIG. 7 is a block diagram of an RAU according to an embodiment of the present disclosure utilizing an RSSI (received signal strength indicator) proximity detector in an out-of-range condition.

An alternate embodiment uses the wireless signal strength to determine the presence of the vehicle 30 in the service area of the RAU 20. This is illustrated in FIGS. 6 and 7. The signal strength transmitted by the mobile transmitter is received by the antenna 22 of the RAU 20. A portion of the received signal is then coupled to a power detecting circuit 24 to be used for proximity sensing.

Figure 8:
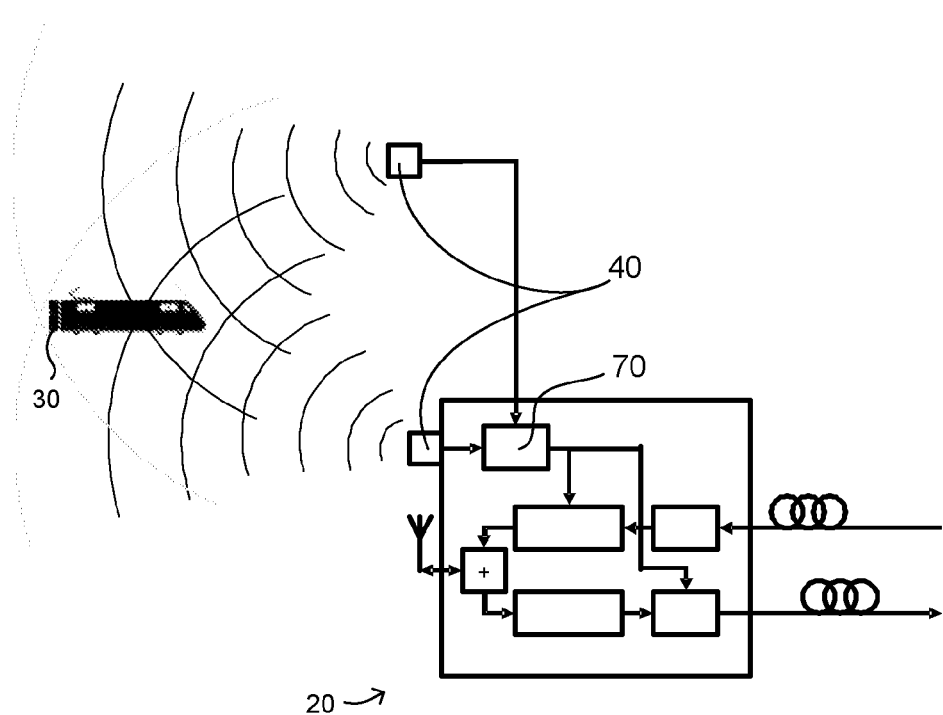
FIG. 8 is a block diagram of an RAU according to an embodiment of the present disclosure utilizing an RSSI (received signal strength indicator) proximity detector in an in-range condition.
Figure 9:
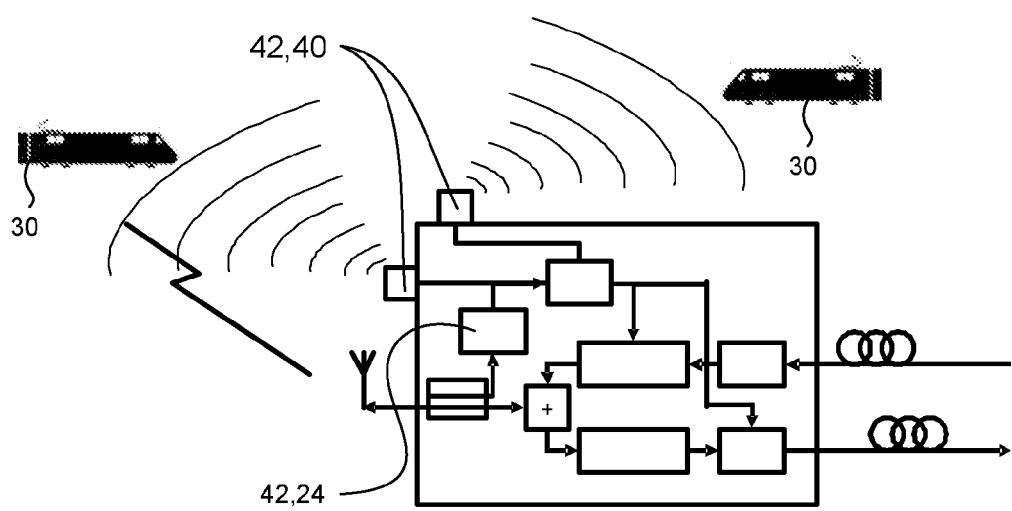
FIG. 9 is a block diagram of an RAU according to an embodiment of the present disclosure utilizing multiple proximity sensors.
Figure 10:
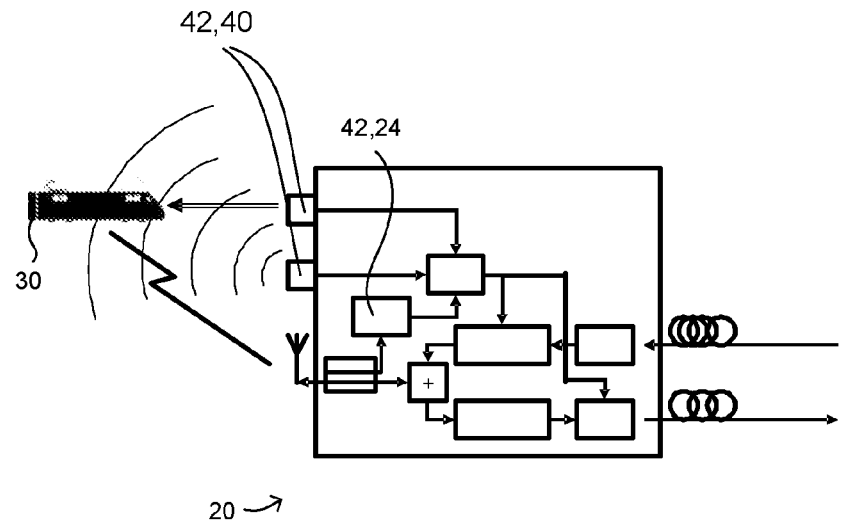
FIG. 10 is a block diagram of an RAU according to another embodiment of the present disclosure utilizing Multiple Proximity Sensors.
Figure 11:
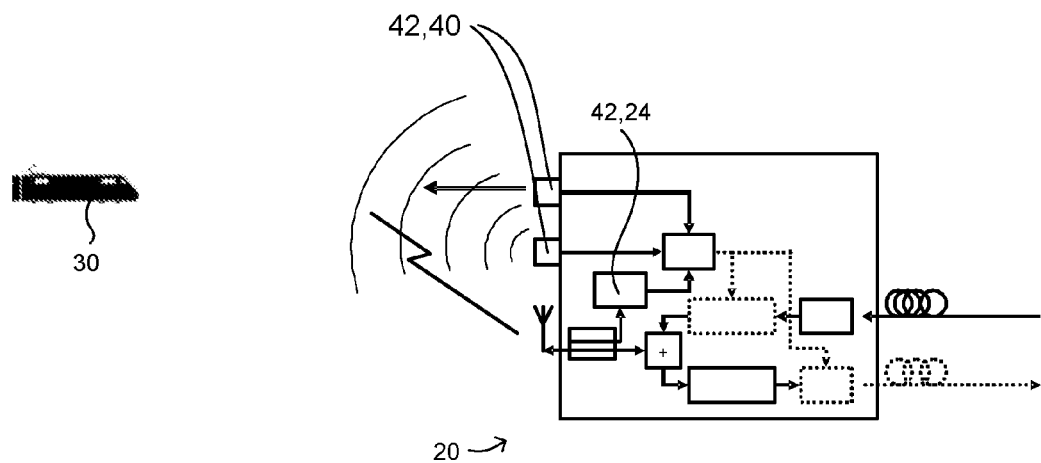
FIG. 11 is a block diagram of an RAU according to an embodiment similar to that of FIG. 10 of the present disclosure in an out-of-range condition.

FIG. 8 shows another embodiment of an RAU 20 that uses a combination of two of the same type of proximity sensors 40 to enhance the robustness against a single proximity sensor failure or false trigger. In this embodiment, two or more sensors 40 can be fed to the input pins of the MCU 70. Using a logical OR function, the RAU 20 can have a redundant fail-safe method to ensure the RAU 20 will turn on reliably with the added redundancy of several proximity sensors. Alternately as shown in FIGS. 9-10, the MCU 70 can be triggered by different types of proximity sensors 42 to further enhance redundancy and/or as a means to sense vehicles 30 of different approach vectors. FIG. 11 illustrates the embodiment when a vehicle 30 using multiple proximity sensors 42 leaves the service area. With the vehicle 30 outside the service area of the RAU 20, the MCU 70 will interpret the combination of signals collectively and return the relevant portions of the RAU 20 back to standby mode.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "programmed" in a particular way, "configured" or "programmed" to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A Broadband wireless mobile communication system for a high speed mobile transportation corridor comprising:
   a base station;
   a distributed antenna radio over fiber system connected to the base station and including remote antenna units distributed along the corridor;
   wherein at least one of the remote antenna units is an autonomous sensing remote antenna unit structured so as toggle between standby and active modes in response to locally sensed presence of one or both of a mobile transceiver and a vehicle along the corridor and wherein the autonomous sensing remote antenna unit includes lasers and photodetectors which are unpowered in the standby mode and powered in the active mode.

2. The communications system of claim 1 wherein the at least one of the remote antenna units toggles between standby and active modes in response to locally sensed presence of a vehicle only.

3. The communications system of claim 1 wherein the at least one of the remote antenna units toggles between standby and active modes in response to locally sensed presence of a mobile transceiver only.

4. The communications system of claim 1 wherein the at least one of the remote antenna units toggles between standby and active modes in response to locally sensed presence of either a vehicle or a mobile transceiver.

5. The broadband wireless communications system according claim 1 wherein the autonomous sensing remote antenna unit includes amplifiers which are unpowered in the standby mode and powered in the active mode.

6. A method of operating a broadband wireless mobile communication system for high a speed mobile transportation corridor comprising:
  providing a base station;
  providing a distributed antenna system connected to the base station and including remote antenna units distributed along the corridor;
    sensing, at the respective remote antenna units, the presence and/or absence of one or both of a mobile wireless transceiver and a vehicle along the corridor within the operating area of the respective remote antenna unit; and
    toggling the remote antenna units between standby and active modes in response to a locally sensed presence of one or both of a mobile transceiver and a vehicle along the corridor, the remote antenna units including lasers and photodetectors which are unpowered in the standby mode and powered in the active mode.

7. The method of operating a broadband wireless mobile communication system according to claim 6 further comprising the step of placing the respective remote antenna unit in an active mode when one or both of a mobile wireless transceiver and a vehicle is sensed within the operating area of the respective remote antenna unit, and/or placing the respective remote antenna unit in a standby mode when one or both of a mobile wireless transceiver and a vehicle is not sensed within the operating area of the respective remote antenna unit.

8. The method of operating a broadband wireless mobile communication system according to claim 7 placing in standby mode includes un-powering amplifiers in the remote antenna unit and placing in active mode includes powering amplifiers in the remote antenna unit.

9. The method of operating a broadband wireless mobile communication system according to claim 6 wherein the step of sensing, at the respective mobile antenna units, the presence and/or absence of one or both of a mobile wireless transceiver and a vehicle comprises sensing with a wireless power sensor.

* * * * *

UNITED STATES PATENT AND TRADEMARK OFFICE
CERTIFICATE OF CORRECTION

PATENT NO. : 9,894,537 B2
APPLICATION NO. : 13/988942
DATED : February 13, 2018
INVENTOR(S) : Bruce Cinkai Chow et al.

It is certified that error appears in the above-identified patent and that said Letters Patent is hereby corrected as shown below:

On the Title Page

In Column 2, Item (57), Abstract, Line 2, delete "high a" and insert -- a high --, therefor.

In the Claims

In Column 7, Line 15, Claim 5, after "according" insert -- to --.

In Column 7, Line 19, Claim 6, delete "high a" and insert -- a high --, therefor.

Signed and Sealed this
Fourteenth Day of May, 2019

Andrei Iancu
*Director of the United States Patent and Trademark Office*